United States Patent [19]

Masheder

[11] Patent Number: 5,274,180
[45] Date of Patent: Dec. 28, 1993

[54] ESTERS

[75] Inventor: David Masheder, Camberley, United Kingdom

[73] Assignee: British Petroleum Company plc, London, England

[21] Appl. No.: 964,986

[22] Filed: Oct. 22, 1992

[30] Foreign Application Priority Data

Oct. 22, 1991 [GB] United Kingdom ............... 9122328

[51] Int. Cl.$^5$ ............................................. C07C 69/66
[52] U.S. Cl. ................................................ 560/184
[58] Field of Search ...................................... 560/184

[56]  References Cited
U.S. PATENT DOCUMENTS

| 3,442,942 | 5/1969 | Sianesi et al. | 560/184 X |
| 3,644,492 | 2/1972 | Bartlett | 260/484 R |
| 3,810,875 | 5/1974 | Rice et al. | 260/899 |
| 3,882,193 | 5/1975 | Rice et al. | 260/874 |
| 3,944,527 | 3/1976 | McCown | 260/79.7 |
| 3,995,085 | 11/1976 | McCown | 428/262 |
| 4,014,857 | 3/1977 | Schmoyer | 260/67.6 R |
| 4,094,911 | 6/1978 | Mitsch et al. | 560/184 X |
| 4,289,892 | 9/1981 | Soch | 560/26 |
| 4,356,273 | 10/1982 | Soch | 521/114 |
| 4,401,780 | 8/1983 | Steel | 524/225 |
| 4,500,739 | 2/1985 | Caporiccio et al. | 568/677 |
| 4,647,413 | 3/1987 | Savu | 260/544 F |

FOREIGN PATENT DOCUMENTS 0338529 10/1989 European Pat. Off. .
0338530 10/1989 European Pat. Off. .
2656423 6/1978 Fed. Rep. of Germany .
A1244189 8/1971 United Kingdom .

Primary Examiner—Arthur C. Prescott
Attorney, Agent, or Firm—David J. Untener; Brian L. Mehosky

[57]  ABSTRACT

Esters of hydroxy terminated monofunctional polyalkylene oxide derivatives and monofunctional perfluoropolyether carboxylic acids are novel compounds. They may be used to form emulsions and to modify droplet size in atomization.

8 Claims, No Drawings

ESTERS

The present invention relates to novel fluorine-containing compounds.

Perfluoro polyethers are known compounds which may be used, for example, to produce microemulsions as disclosed in EP 250 766 and EP 280 312. The production of perfluoropolyethers having functional groups at each end of a perfluoropolyether chain is disclosed in U.S. Pat. No. 4 094 911, where the perfluoropolyethers are used in the production of polyurethanes.

We have now found a novel class of perfluoropolyethers having valuable properties.

According to the present invention there is provided a novel class of compounds which are esters of
(a) a hydroxy terminated monofunctional polyalkylene oxide derivative having a peak molecular weight in the range 250 to 3500 and
(b) a monofunctional perfluoropolyether carboxylic acid having a peak molecular weight in the range 750 to 4500.

The hydroxy terminated compound and the acid are normally produced as mixtures containing molecules with a range of molecular weights with a proportion having a given molecular weight being distributed on either side of a maximum or peak value. The molecular weight distribution may be measured by laser desorption ion cyclotron resonance mass spectrometry. This enables the signal intensity for different molecular weights to be determined. The molecular weight corresponding to the peak of the signal is the peak molecular weight.

The hydroxy terminated poly(alkylene oxide) derivative may be for example a derivative of ethylene oxide or of a mixture of ethylene and propylene oxide.

The desired monofunctional poly(alkylene oxide) derivative may be obtained by the reaction of alkylene oxide with a starter molecule, e.g. a $C_1$-$C_4$ alkanol. Thus for example methanol may be used to give a methyl terminated chain, ethanol to give an ethyl terminated chain, and butanol to give a butyl terminated chain. The other end of the chain is terminated by a hydroxy group.

The hydroxy-containing starting materials can be made with a variety of molecular weights. Examples of compounds which may be used in preparing the novel compounds of the present invention are those having peak molecular weights in the range 250 to 2000, for example 300 to 850.

The acid component of the novel esters of the present invention is a monofunctional perfluoropolyether monocarboxylic acid. Such acids are commercially available under the tradenames "Galden" or "Krytox" monoacids. They consist of a perfluoropolyether chain terminated at one end by a perfluoroalkoxy group and at the other by a group —$CF_2COOH$. The perfluoropolyether chain may consist of perfluoropropoxy groups —($CF_2$—$CF(CF_3)$—O)— and perfluoromethoxy groups —($CF_2$—O)—.

The perfluoropolyether carboxylic acid has a peak molecular in the range 750 to 4500, for example, 1000 to 2500.

It is preferred to use acids in which the ratio of perfluoropropoxy units to perfluoromethoxy units is in the range 1:1 to 20:1.

The reaction of the acid and the hydroxy compound may be carried out using conventional esterification techniques. It is believed that it is desirable to carry out the esterification under substantially non-aqueous conditions. The reaction may be carried out by way of the acid chloride as an intermediate, made for example by reacting the acid with phosphorus pentachloride. An alternative, preferred, method is to react the acid and the hydroxy terminated monofunctional polyalkylene oxide derivative at elevated temperature in a solvent, e.g. benzene, while distilling off water as it is formed.

Long chain perfluoropolyethers have useful properties but many of those commercially available are difficult to disperse in water. The compounds of the present invention may be used to promote the dissolution or dispersion of perfluoropolyethers having higher molecular weights or a higher proportion of perfluoropropoxy groups than the compounds of the present invention and which would otherwise be difficult to disperse or dissolve in water.

The compounds of the present invention may be used to form emulsions which may have uses, for example, in cosmetics. They may be added to liquids, e.g. hydrocarbons, to modify their behaviour on atomization, for example, by giving a finer droplet size or a narrower droplet size distribution.

The invention will now be described with reference to the following examples.

EXAMPLE 1

Perfluoro acid (30g) commercially available as "Galden" monoacid was introduced into a reaction vessel. The acid was a monofunctional carboxylic acid with the carboxylic acid group attached to a perfluoropolyether chain. The peak molecular weight was determined by laser desorption ion cyclotron resonance mass spectroscopy to be about 1100.

Phosphorus pentachloride was added at room temperature (ca. 20° C.) to the perfluoro acid until gas evolution ceased. The amount of phosphorus pentachloride added was 7.6g. The by-products (phosphorus oxychloride, HCl) were removed by evaporation to leave the acid chloride.

Poly(ethylene glycol) mono methyl ether (2.0g) from a commercial source and sold as having an average molecular weight of 350 (PEG 350) was added to the acid chloride (6.62g) at room temperature. The peak molecular weight of the PEG 350 was determined to be about 384.

The reaction mixture was initially milky, but quickly cleared on standing. HCl produced as a by-product was removed by applying reduced pressure.

The resulting product had an infrared absorption band at 1790 $cm^{-1}$. NMR spectroscopy showed that the reaction product was a mixture of the required ester and a small amount (24%) of unreacted poly(ethylene glycol)mono methyl ether.

EXAMPLE 2

An experiment was carried out as in Example 1 except that the poly(ethylene glycol) mono methyl ether was one sold as having a average molecular weight of 750 (PEG 750). The peak molecular weight was determined to be about 824. The quantity of PEG used was 6.0 g and this was added to 11.4 g of the acid chloride. NMR spectroscopy showed that the reaction product was a mixture of the required ester and a small amount of unreacted PEG 750 (24%).

EXAMPLE 3

A mixture of the perfluoro acid (56.5 g), PEG 750 (56 g) and benzene (75 ml) was placed in a 500 ml round bottomed flask, equipped with a Dean and Stark water separation unit carrying an efficient reflux condenser at its upper end. The mixture was refluxed using a magnetic stirrer/hot plate unit until no more water collected in the water separator. The benzene was removed by evaporation under reduced pressure. NMR and IR spectroscopy confirmed that the reaction product was the required ester.

I claim:

1. An ester of
   (a) a hydroxy terminated mono-functional polyalkylene oxide derivative having a peak molecular weight in the range 250 to 3500, and
   (b) a monofunctional perfluoropolyether carboxylic acid having a peak molecular weight in the range 750 to 4500.

2. An ester according to claim 1 in which the hydroxy terminated mono-functional poly(alkyleneoxide) derivative is a derivative of ethylene oxide.

3. An ester according to claim 2 wherein the hydroxy terminated poly(alkyleneoxide) derivative is a derivative of a mixture of ethylene and propylene oxide.

4. An ester according to claim 1 wherein the hydroxy terminated derivative is derived from the reaction of an alkylene oxide with a $C_1$–$C_4$ alkanol.

5. An ester according to claim 1 wherein the hydroxy terminated monofunctional poly(alkylene oxide) derivative has a peak molecular weight in the range 300 to 2000.

6. An ester according to claim 5 wherein the peak molecular weight is in the range 300 to 850.

7. An ester according to claim 1 wherein the monofunctional perfluoropolyether carboxylic acid has a chain consisting of perfluoropropoxy groups and perfluoromethoxy groups.

8. An ester according to claim 7 wherein the ratio of perfluoropropoxy units to perfluoromethoxy units is in the range 1:1 to 20:1.

* * * * *

UNITED STATES PATENT AND TRADEMARK OFFICE
CERTIFICATE OF CORRECTION

PATENT NO. : 5,274,180
DATED : December 28, 1993
INVENTOR(S) : David Masheder

It is certified that error appears in the above-identified patent and that said Letters Patent is hereby corrected as shown below:

Claim 5, col. 4, line 12, change "300" to "250".

Signed and Sealed this

Seventeenth Day of May, 1994

Attest:

BRUCE LEHMAN

Attesting Officer — Commissioner of Patents and Trademarks